United States Patent [19]

Adair et al.

[11] 4,090,169
[45] May 16, 1978

[54] METHOD AND APPARATUS FOR DETERMINING RELATIVE PHASE AND SENSITIVITY OF ELEMENTS IN AN ACOUSTIC ARRAY

[75] Inventors: Lyles C. Adair; Willis A. Teel; Christian P. F. Werle, all of Panama City; John A. Hutton, Lynn Haven, all of Fla.

[73] Assignee: The United States of America as represented by the Secretary of the Navy, Washington, D.C.

[21] Appl. No.: 781,088

[22] Filed: Mar. 25, 1977

[51] Int. Cl.[2] .................... H04B 11/00; H04R 29/00
[52] U.S. Cl. .................................. 340/5 C; 73/1 DV
[58] Field of Search ...................... 340/5 C; 73/1 DV

[56] References Cited

U.S. PATENT DOCUMENTS 3,393,400   7/1968   Trott ........................... 340/5 C Primary Examiner—Richard A. Farley
Attorney, Agent, or Firm—Richard S. Sciascia; Harvey A. David

[57] ABSTRACT

Relative phase and sensitivity characteristics of individual transducer elements in a long acoustic array are determined by sequentially positioning a transmitting element in predetermined spaced relation to each array element by means of an array holding member and a trough-like spacing member that contains a known transmission medium, driving the transmitting element with a test frequency input signal that is pulsed at a predetermined repetition rate, gating the output signal from the array element under test to an oscilloscope for phase comparison with an adjustably phase shifted version of the input signal, and measuring amplitudes of both input and output signals.

13 Claims, 3 Drawing Figures

METHOD AND APPARATUS FOR DETERMINING RELATIVE PHASE AND SENSITIVITY OF ELEMENTS IN AN ACOUSTIC ARRAY

BACKGROUND OF THE INVENTION

This invention relates generally to testing and calibration of electroacoustic transducers, and more particularly to a novel method and apparatus for determining relative phase and sensitivity characteristics of elements of a long multi-element, high frequency array for the purpose of determining phase trimming and sensitivity shading necessary to achieve accurate near field focusing of the array.

In an ideal situation, measurements of phase and sensitivity parameters of the array receiving elements would be made while the elements of the array are simultaneously subjected to incidence of a high frequency, plane wavefront. Conventional methods have used a substantially plane wave produced by placing projectors in the far field region, by using collimators for converting a curved wave front to plane, or by using a projecting array having a plurality of projectors shaded so as to generate a substantially plane wave. The last method is described in U.S. Pat. No. 3,393,400 to W. J. Trott, assigned to the assignee hereof.

These prior art techniques, while of considerable use in certain situations, are subject to disadvantages, particularly when operating at frequencies in the megaherz ranges. Thus, for long, high frequency arrays the required distance between a source projector and the array is extremely large and creates many difficult problems of alignments and compensations for environmental constraints. Acoustic collimators and calibrating arrays of the type mentioned in the above noted patent are expensive and alignment is extremely difficult.

SUMMARY OF THE INVENTION

With the foregoing in mind, it is a principal object of this invention to provide an improved method and apparatus for measuring a variety of operational characteristics for each of a plurality of electroacoustic transducer elements of a long, multi-element array.

Another important object of the invention is the provision of a simple, reliable, inexpensive and accurate method and apparatus for obtaining comparative measurements of phase and sensitivity of side-by-side transducer elements of an acoustic array corresponding to those which would be obtained in response to a plane wave.

Yet another object of the invention is the provision of apparatus which permits testing and measuring of the desired parameters under controlled, repeatable conditions within limited working spaces.

As still another object, the invention aims to provide those advantages obtaining from avoidance of tests in open water, expensive anechoic chambers or tanks, use of complex collimators and other plane wave front generators.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
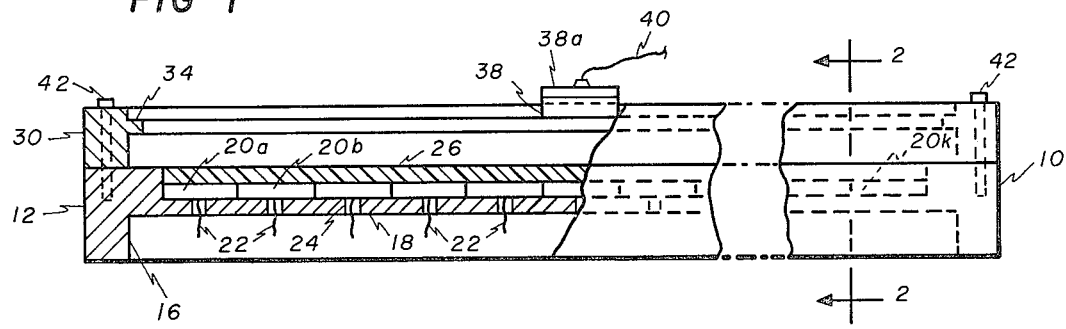
FIG. 1 is a side view, partly in elevation and partly in section, of a long, plural element acoustic array in association with testing and positioning apparatus forming part of this invention.
Figure 2:
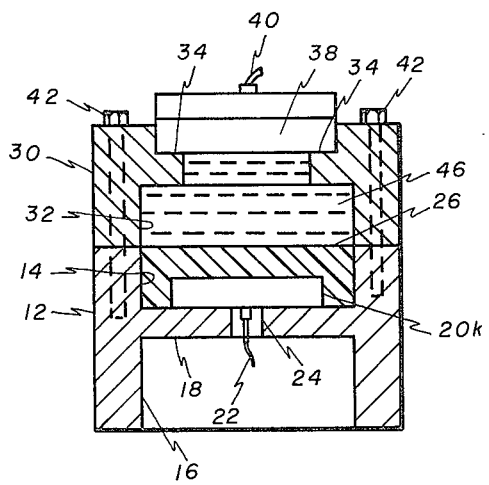
FIG. 2 is a sectional view, on an enlarged scale, of the array and apparatus of FIG. 1.

Referring now to FIGS. 1 and 2, a long, high frequency electroacoustic array is generally indicated at 10 and comprises an array holder or support member 12 formed of a rigid material such as steel. Member 12, the external configuration of which is generally rectangular, is provided with an upper rectangular recess 14 and a lower rectangular recess 16 so as to be substantially H-shaped in cross-section. A horizontal web 18 separates these recesses.

A plurality of electro-acoustic transducer elements $20a$, $20b$,—$20k$ are disposed in sided-by-side relation in the upper recess 14 of member 12. Each of the elements $20a$, $20b$, $20k$ is provided with appropriate lead wires 22 which project through corresponding openings 24 in the web 18 into the lower recess 16. A body of waterproof, electrically insulating, and acoustically transparent potting compound 26 fills the recess 14 around the transducer elements $20a$, $20b$,—$20k$.

It will be understood at this point that the electroacoustic transducers $20a$, $20b$,—$20k$ may be designed for receiving only, but will usually be of the reversible or transmit/receive type.

Mounted on the upper surface of the array holder member 12 is a spacer member 30, formed of steel or other rigid material. Member 30 is generally rectangular in outer configuration and is substantially congruent with member 12. The member 30 has side walls defining a rectangular opening 32 through the member, which opening is congruent with the recess 14 in member 12. A pair of parallel ribs 34 extend inwardly from the sidewalls of member 30 to serve as a guide or track for a signal source in the form of a transmitting electroacoustic element 38. The transmitting element 38, which is served by suitable flexible lead wires 40, is adapted to be moved along the track or guide ribs 34 between successive operating positions opposite each of the array elements, $20a$, $20b$,—$20k$.

The spacer member 30 has its lower edge in tight engagement with the upper edge of the holder member 12, and is fixed thereon as by bolts 42. The opening 32 is thereby closed by the surface of the potting 26 to define a cavity in which a suitable acoustically transmitting medium 46 having known acoustic properties is contained. In the embodiment being described the transmission medium is fresh water, although other fluids may, of course, be used. The opening or cavity 32 is filled with the transmission medium 46 sufficiently to ensure that the lower face of transmitting element 38 is in full contact therewith. A weight $38a$ is carried by the transmitting element 38 to ensure that it is held in good contact with the track ribs 34.

It is important that the upper surfaces of the track ribs 34 are as nearly parallel as is praticable to the upper surfaces of the array elements $20a$, $20b$,—$20k$. In a working embodiment of the invention wherein frequencies up to 1 MHz are used, the mating surfaces of the holder member 12 and the spaces member 30 were carefully machined flat and the upper track rib surfaces machined parallel thereto within 0.001 inch. This assures that the same spacing $d$ will exist through a column of the transmission medium, between the transmit element 38 and the surface of the potting 26, for each of the array elements 20a, 20b,—20k.

It is also advantageous to have the width of the cavity 32 on the order of twice the vertical dimension thereof, to minimize interference from sidewall reflections. These may be further reduced by use of anechoic coatings (not shown) on the inner surfaces of the spacer member 30.

Figure 3:
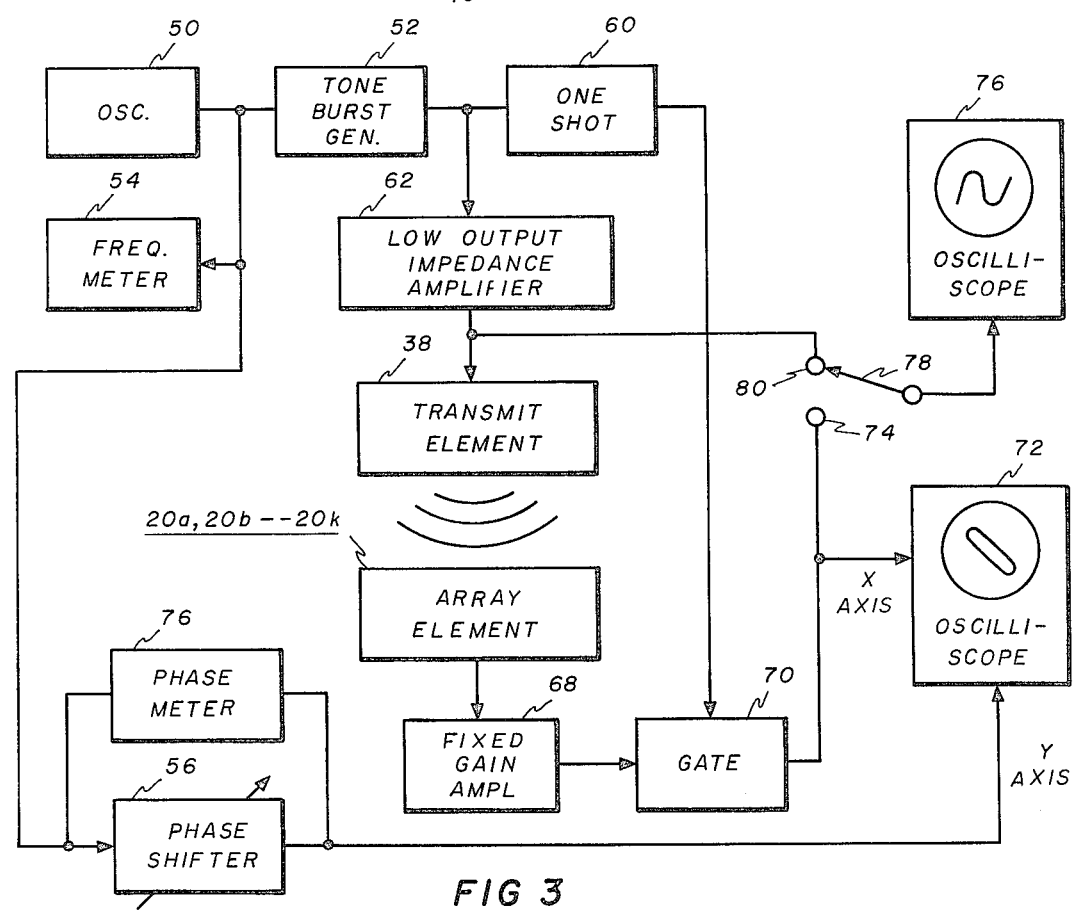
FIG. 3 is a diagrammatic illustration, in block form, of apparatus embodying the invention and used in practice of the method thereof.

Referring now to FIG. 3, an oscillator 50 provides the operating frequency for the tests, and has its output connected as shown to a tone burst generator 52, to a frequency meter 54, for checking the output frequency of the oscillator, and to a variable phase shifter 56. The tone burst generator 52 serves to provide an output of only $n$ cycles of the test frequency $f$ every $m$ seconds. This tone burst or pulse output of generator 52 is applied, as shown, to a monostable multivibrator or one shot 60 and to a low output impedance amplifier 62.

The amplifier 62 drives the transmit element 38 to project pulses of an acoustic signal 64 of $n$ cycles, at the test frequency, every $m$ seconds into the transmission medium 46, where:

$n = d/\lambda$, $\lambda$ is the wavelength of frequency $f$ in the transmission medium, and $n \leq m/4$. This assures that there will be definite intervals, between transmission pulses, of sufficient length that no interference will occur between reflections from the potting or array element surfaces and a subsequent pulse.

The electrical output of the one of the array elements under test at any time is connected to the input of a fixed gain, inverting amplifier 68. The output of amplifier 68 is adapted to be passed by a gate 70, when enabled, to the x axis input of a first oscilliscope 72 and to a terminal 74. The gate 70 has its control input connected to the output of the one shot 60. The $y$ axis input of the oscilliscope 72 is connected to the output of the phase shifter 56.

A second oscilliscope 76 has its $y$ or vertical axis connectable alternatively, as by a contactor 78, to terminal 74 and to a terminal 80 connected to the output of the amplifier 62.

MODE OF OPERATION

With the oscillator 50 operating to provide a selected test frequency $f$, as measured by meter 54, the transmit element 38 is positioned along the track ribs 34 of spacer member 30 at a location directly opposite a selected one of the array elements 20a, 20b,—20k, say element 20a. The tone burst generator provides pulses of $n$ cycles of alternating current at frequency $f$ and a pulse repetition rate of $m$ per second. These pulses are amplified by amplifier 62 and projected as acoustic energy waves 64 into the transmission medium.

The selected array element converts the acoustic energy to corresponding a.c. electrical signals of frequency $f$. These signals are inverted and applied to the gate 70. The one shot 60 enables the gate 70 during the pulse period that the $n$ cycles are being transmitted by the transmit element 38, and disables the gate during other times. Thus, gate 70 is enabled $m$ times per second to pass the inverted output of the array element to the $x$ axis input of the oscillisope 72. Meanwhile, the oscillator output $f$ is passed by phase-shifter 56 to the $y$ axis input of the oscilliscope 72 so as to produce a Lissajous figure indicative of the phase relationship between the input of amplifier 62 to the transmit element and the output of the array element under test. The phase shifter 56 is then adjusted until the input to the transmit element and the output of the array element are in phase as indicated by the oscilliscope 72. At this time a reading is taken of the phase meter 76 which shows the amount of phase shift introduced by the phase shifter. This value is recorded for later comparison with subsequently acquired phase shift values for each of the other array elements.

Next, a peak-to-peak voltage amplitude reading is made of the input signal V$i$ to the transmit element 38. Then, contactor 78 is moved to terminal 74 and a peak-to-peak voltage amplitude reading is made of the output signal V$o$ from the array element being tested. The ratio of the output amplitude to the input amplitude provides a relative sensitivity value for the array element.

The foregoing procedure is repeated for each of the other array elements 20b,—20k, with the transmit element 38 positioned directly over each array element during the testing thereof. It will be appreciated that, inasmuch as the transmission medium column $d$ is identical for each such position, any differences in the phase meter readings for the respective array elements will be due to phase change differences in the array elements themselves. Accordingly, the phase meter readings provide a measure of the relative phase change effects of the individual elements.

The relative phase and relative sensitivity values are readily used in a known manner, by introducing phase change delays and signal level adjustment for each of the array elements, as necessary, to achieve the desired near field focusing of the array for use either in a projecting mode or a receiving mode.

Various refinements of the invention and alternative constructions will be apparent to the skilled practitioner. For example, in order to maintain the transmission medium 46 at a constant level that will assure full contact with the transmit element, a reservoir and pumping system can be included that will replenish the medium automatically as necessary. Also, an indexing means could be provided for accurately and quickly repositioning the transmit element over each array element, and switching means provided so that a single oscilliscope, or equivalent device for the purpose, can be used for making the phase comparisons and amplitude measurements.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. Apparatus for determining relative operational characteristics of individual electroacoustic transducer array elements of an array including holder means and a plurality of array elements disposed in side-by-side relation with their faces lying in a common plane, said apparatus comprising:

spacer means, mounted on said holder means, for providing a guide surface in parallel spaced relation to said common plane;

a transmit element disposed for movement along said guide surface into positions in opposition to each of said array elements at a predetermined distance $d$ therefrom;

an acoustically transmitting medium between said transmitter element and said array elements;

input signal generating means, connected to said transmit element, for causing said transmit element to project acoustic energy signals of predetermined frequency through said medium to each of said array elements when said transmit element is positioned in opposition thereto;

variable phase shifter means, connected to said input signal generating means, for providing a selectively variable phase signal of said predetermined frequency;

phase comparison means, coupled to said array element and to said phase shifter means, for indicating an in-phase relationship between said output signal and said phase shifted signal; and phase meter means for measuring the amount of phase shift required by said phase shifter means to achieve said in-phase relationship.

2. Apparatus as defined in claim 1, and wherein said spacer means comprises:

a rectangular body member secured to said array holder means, said body member defining a cavity for containing said transmission medium, and said body member being characterized by a track presenting said guide surface.

3. Apparatus as defined in claim 2, and wherein said transmission medium comprises a liquid.

4. Apparatus as defined in claim 3, and wherein said cavity is characterized by a width that is substantially twice said predetermined distance $d$.

5. Apparatus as defined in claim 4, and wherein said input signal generating means comprises:

an oscillator for generating an alternating current signal at said predetermined frequency;

a tone burst generator connected to said oscillator and operative to provide an output pulse every $m$ seconds, each of said pulses comprising $n$ cycles of said predetermined frequency; and power amplifier means for amplifying said output of said tone burst generator to provide said input signal to said transmit element.

6. Apparatus as defined in claim 5, and wherein:

$n = d/\lambda$, where $\lambda$ is the wavelength of said frequency in said transmission medium, and $n \leqq m/4$.

7. Apparatus as defined in claim 5, and further comprising:

a monostable multivibrator, responsive to said pulses to provide corresponding gate pulses each having a predetermined duration; and gate means, responsive to said gate pulses, for passing said output signal to said phase comparison means only for the duration of each gate pulse.

8. Apparatus as defined in claim 7, and wherein said phase comparison means comprises an oscilliscope.

9. Apparatus as defined in claim 8, and further comprising:

signal amplitude measuring means, connected alternatively to the output of said amplifier and to the output of said gate, for measuring the amplitudes of said input and said output signals respectively.

10. A method of determining operational characteristics of individual electroacoustic transducer array elements disposed in side-by-side relation with their faces lying in a common plane, said method comprising the steps of:

confining a body of an acoustic transmission medium in front of said array elements;

positioning an electroacoustic projector suquentially in front of each of said array elements, at a predetermined constant distance therefrom;

energizing said projector with an electrical input signal comprising pulses of $n$ cycles of a predetermined a.c. frequency at a repetition rate of one pulse every $m$ seconds to project corresponding pulses of acoustic energy into said medium toward each of said array element in its sequential turn;

applying said input signal to variable phase shifter means to provide a phase shifted electrical signal;

varying the phase of said phase shifted electrical signal to match the phase of said output electrical signal; and measuring the phase shift introduced by said phase shifter means for effecting said match for each of said array elements, as a determination of the relative phase characteristic of each of said array elements.

11. The method as defined in claim 10 and further comprising the step of:

measuring the peak to peak amplitude of said input signal;

measuring the peak to peak amplitude of said output signal for each of said array elements; and determining the ratios of said peak to peak amplitudes of said output signals to said peak to peak amplitude of said input signal as a determination of the relative sensitivity of each of said array elements.

12. Apparatus for determining relative operational characteristics of individual electroacoustic transducer array elements of an array including holder means and a plurality of array elements disposed in side-by-side relation with their faces lying in a common plane, said apparatus comprising:

an electroacoustic transmit element;

support means for holding said transmit element in successive positions in opposition to each of said array elements at a predetermined distance $d$ therefrom;

an acoustically transmitting medium between said transmit element and said elements;

means for generating an input signal of a predetermined frequency;

said transmit element being responsive to said input signal to project acoustic energy signals of said frequency through said medium to a selected one of said array elements when said transmit element is positioned in opposition thereto;

variable phase shifter means, responsive to said input signal for providing a selectively variable phase shifted signal of said predetermined frequency;

phase comparison means, responsive to the electrical output of said selected array element and to said phase shifted signal, for indicating an in-phase relationship therebetween; and phase meter means for measuring the amount of phase shift required by said phase shifter means to achieve said in-phase relationship.

13. Apparatus as defined in claim 12, and wherein said support means comprises:

a rectangular body member secured to said array holder means, said body member defining a cavity for containing said transmission medium, and said body member being characterized by a track presenting a guide surface parallel to said array element faces.

* * * * *